United States Patent
Burness

(10) Patent No.: US 7,098,801 B1
(45) Date of Patent: Aug. 29, 2006

(54) USING BITMASKS TO PROVIDE VISUAL INDICATION OF OPERATIONAL ACTIVITY

(75) Inventor: John Oliver Burness, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/168,720

(22) Filed: Jun. 28, 2005

(51) Int. Cl.
*G08B 5/00* (2006.01)

(52) U.S. Cl. .............................. 340/815.4; 340/691.1; 340/691.6; 340/815.45

(58) Field of Classification Search ............. 340/815.4, 340/815.45, 641, 642, 691.1, 691.6, 691.2, 340/691.3; 362/612, 611, 800
See application file for complete search history.

(56) References Cited

U.S. PATENT DOCUMENTS

| | | | |
|---|---|---|---|
| 4,330,870 A | 5/1982 | Arends | |
| 4,803,657 A | 2/1989 | Giebel et al. | |
| 4,999,767 A | 3/1991 | Durkin | |
| 5,214,762 A | 5/1993 | Bush et al. | |
| 5,412,221 A | 5/1995 | Curtis et al. | |
| 5,495,346 A | 2/1996 | Choi et al. | |
| 5,552,800 A | 9/1996 | Uchikoga et al. | |
| 5,623,691 A | 4/1997 | Clohset et al. | |
| 5,657,455 A * | 8/1997 | Gates et al. ................. | 710/100 |
| 5,761,527 A | 6/1998 | Clohset et al. | |
| 5,777,590 A | 7/1998 | Saxena et al. | |
| 5,996,079 A * | 11/1999 | Klein .......................... | 713/300 |
| 6,040,812 A | 3/2000 | Lewis | |
| 6,184,854 B1 | 2/2001 | Hotto et al. | |
| 6,288,698 B1 | 9/2001 | Ishii et al. | |
| 6,417,864 B1 | 7/2002 | Jones et al. | |
| 6,462,728 B1 | 10/2002 | Janssen et al. | |
| 6,658,577 B1 * | 12/2003 | Huppi et al. ................. | 713/323 |
| 6,714,206 B1 | 3/2004 | Martin et al. | |
| 6,756,995 B1 | 6/2004 | Thebault et al. | |
| 6,864,870 B1 | 3/2005 | Kim et al. | |
| 6,919,816 B1 * | 7/2005 | Dearborn et al. ...... | 340/815.45 |
| 2004/0056983 A1 | 3/2004 | Dean | |
| 2005/0146491 A1 * | 7/2005 | Su et al. ........................ | 345/87 |

FOREIGN PATENT DOCUMENTS

| | | |
|---|---|---|
| EP | 0 656 616 A1 | 7/1995 |
| JP | 55115028 A2 | 9/1980 |
| JP | 59230114 A2 | 12/1984 |
| JP | 04051287 A2 | 2/1992 |
| JP | 2001134260 A2 | 5/2001 |
| JP | 2003223146 A2 | 8/2003 |
| KR | 1039182 A | 5/2001 |

* cited by examiner

*Primary Examiner*—Toan N. Pham
(74) *Attorney, Agent, or Firm*—Fellers, Snider, et al.

(57) ABSTRACT

Method and apparatus for providing a visual indication of operational activity of a device, such as a selected data transfer state. A pattern generator provides one or more bitmasks, each comprising a selected multi-bit sequence of logical values. A switching circuit selectively activates a visual indicator, such as a light emitting diode (LED), to provide a different visual indication in relation to each bitmask. Preferably, a time-varying rate at which the visual indicator is activated in response to each bitmask is selected to be different from a rate, as perceived by a human observer, of activation of the indicator. The pattern generator is preferably implemented as a programming module in a memory space and executed by a processor. Alternatively, the pattern generator is implemented in hardware preferably through the use of an index table and shift register circuitry.

20 Claims, 3 Drawing Sheets

| ACTIVITY LEVEL | BEAM INTENSITY | FLASH RATE | BITMASK |
|---|---|---|---|
| 1 | 10% | LOW | SEQUENCE 1 |
| 2 | 16% | MED | SEQUENCE 2 |
| 3 | 22% | HIGH | SEQUENCE 3 |
| 4 | 28% | LOW | SEQUENCE 4 |
| 5 | 34% | MED | SEQUENCE 5 |
| . | . | . | . |
| . | . | . | . |
| . | . | . | . |
| N | 100% | LOW | SEQUENCE N |

USING BITMASKS TO PROVIDE VISUAL INDICATION OF OPERATIONAL ACTIVITY

FIELD OF THE INVENTION

The claimed invention relates generally to the field of electronic devices and more particularly, but not by way of limitation, to an apparatus and method for providing a visual indication to a user to indicate a level of operational activity of a device.

BACKGROUND

Visual indicators are used in a variety of electronic devices. Such indicators advantageously convey useful information to the user with regard to a particular state of the device.

For example, a personal computer (PC) can utilize a light emitting diode (LED) that is mounted to the front of a computer case. The LED is "lit" when the computer system is on, indicating a health status of the device (e.g., power is being applied, the system is active, etc.). The LED can also be configured to intermittently flash when particular activities are taking place, such as a transfer of data between an operational memory space (e.g., system RAM) and a data storage device (e.g., an internally mounted hard disc drive). Visual indicators can also be used to identify the presence of one or more queued messages for a cellular phone, to signify a power charge/discharge state for a digital camera or other portable device, etc.

While various approaches have been taken to implement and control such visual indicators, there nevertheless remains a continued need for improvements in the art, and it is to such improvements that the claimed invention is generally directed.

SUMMARY OF THE INVENTION

Preferred embodiments of the present invention are generally directed to an apparatus and method for providing a visual indication of operational activity of a device.

In accordance with preferred embodiments, a pattern generator provides one or more bitmasks. Each bitmask comprises a selected multi-bit sequence of logical values, and corresponds to a selected operational activity of the device such as a power-on state or a selected data transfer operation.

A switching circuit selectively activates a visual indicator, such as a light emitting diode (LED), to provide a different visual indication in relation to each bitmask. The rate at which the visual indicator is selectively activated is a time-varying rate that is different from a rate of activation of the indicator as perceived by a human observer.

The pattern generator is preferably implemented as a programming routine resident in a memory space and executed by a processor. Alternatively, the pattern generator is preferably implemented in hardware, such as through the use of an index table and shift register circuitry.

These and various other features and advantages which characterize the claimed invention will become apparent upon reading the following detailed description and upon reviewing the associated drawings.

DETAILED DESCRIPTION

Figure 1:
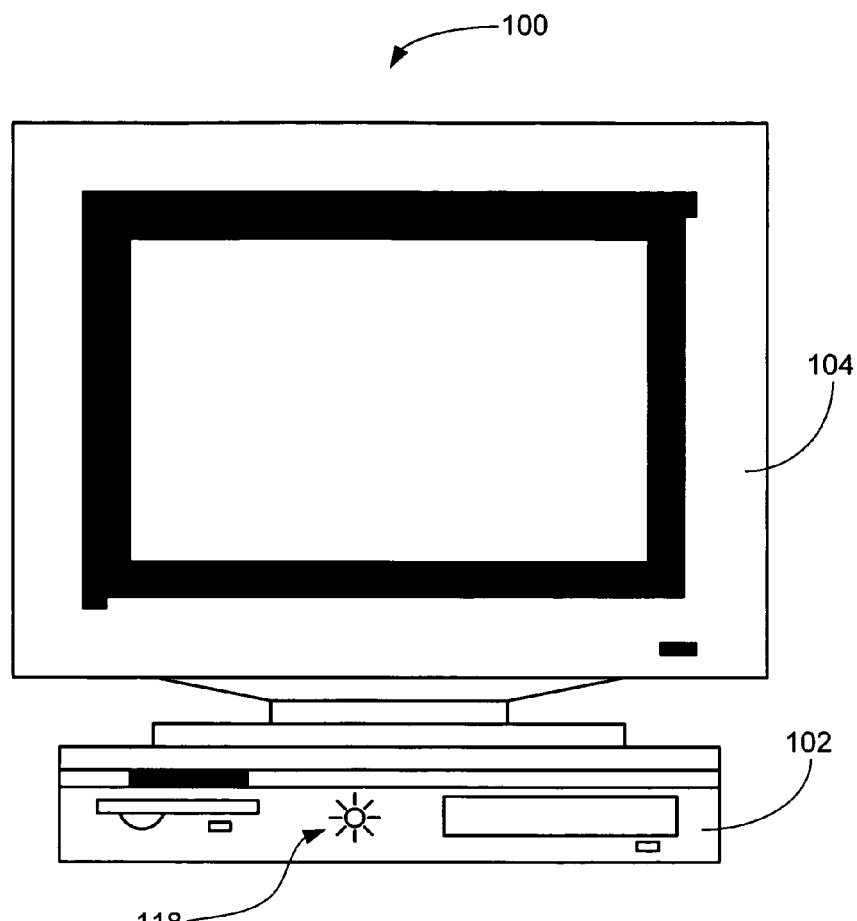
FIG. 1 is an elevational representation of a personal computer (PC) workstation constructed and operated in accordance with preferred embodiments of the present invention.

In order to provide an exemplary embodiment in which preferred embodiments of the present invention can be advantageously practiced, FIG. 1 depicts a personal computer (PC) workstation 100 of the type used to carry out PC related tasks. The workstation 100 can be a stand-alone computer, can be linked to a local area or wide area network, can be a controller in a large capacity data storage array system that communicates with remote systems via a fabric (such as the Internet), etc.

The workstation 100 includes a number of features and capabilities that are well known to the reader and thus further discussion thereof is omitted for brevity. It is sufficient for the present purposes to point out a case (housing) 102, and a monitor display 104 of the LCD variety.

Figure 2:
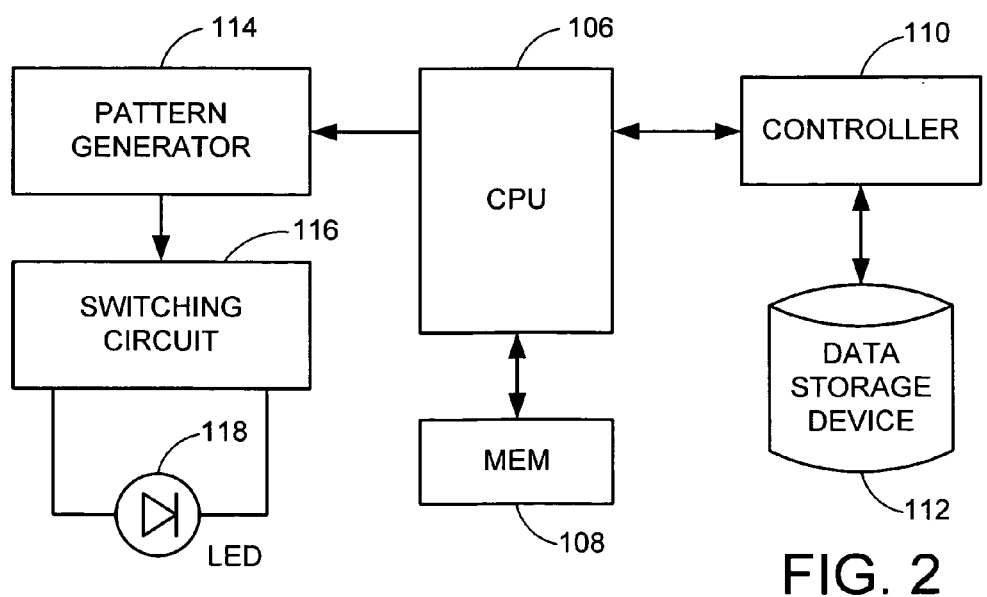
FIG. 2 is a simplified functional block diagram of the workstation of FIG. 1.

The case 102 preferably houses a number of components such as including those depicted in FIG. 2. A central processing unit (CPU) 106 provides central communication and control functions for the workstation 100, and is preferably mounted on a motherboard (not separately shown). During operation the CPU 106 accesses system memory 108, preferably characterized as a volatile memory space (RAM).

A controller card 110 preferably plugs into the motherboard to facilitate communication between the CPU 106 and an internally mounted data storage device 112. For purposes of the present discussion, the device 112 will be contemplated as comprising a hard disc drive which magnetically stores and retrieves data to and from one or more rigid rotatable data storage discs.

FIG. 2 further shows a pattern generator 114 in communication with the CPU 106. The pattern generator 114 can be realized in hardware or firmware; that is, as a hard-wired logic circuit disposed on the motherboard, as a processing module of the programming stored in MEM 108 and carried out by the CPU 106, or a combination of both, as desired.

A switching circuit 116 controls a visual indicator 118. The switching circuit 116 is preferably realized in hardware, and the visual indicator 118 is preferably characterized as a light emitting diode (LED) mounted to the front of the case 102 (FIG. 1) for ready perception by a user of the workstation 100.

The pattern generator 114 preferably operates to output bitmasks to the switching circuit 116, which in turn selectively activates and deactivates the visual indicator 118 in relation thereto. Each bitmask preferably comprises a unique multi-bit pattern sequence of logical 0's and logical 1's to communicate activity information to the user.

Figure 3:
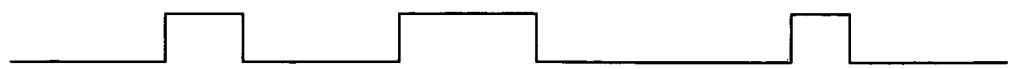
FIG. 3 shows an exemplary bitmask provided by the pattern generator of FIG. 2 that activates the visual indicator of FIG. 2 at a time-varying rate.

The rate at which the visual indicator is activated by the switching circuit 116 in response to each bitmask is a selected time-varying rate (i.e., variable with respect to time), such as depicted in FIG. 3. This applied time-varying rate is selected to be different from a rate of activation of the indicator 118 as perceived by the human observer.

The bitmasks correspond to different operational activities of the system, such as I/O transfers, that are not associated with operation of the visual indicator 118. Thus, the visual indicator is characterized as a secondary indicator of a separate ongoing activity, rather than being the primary activity itself such as operation of a display device (e.g., 104) to provide image data.

The pattern generator 114 is preferably implemented in software (e.g., a routine executed by the CPU 106), but can alternatively be implemented in hardware that utilizes command inputs from the CPU 106, as desired. Preferred exemplary implementations using software and hardware will be presented below.

At this point, however, it may be helpful to first briefly discuss various general principles relating to using a lighted indicator to communicate information to an observer. As will be recognized, activity levels can be indicated by the intensity (brightness) of the indicator. This can be implemented by physically changing the intensity of the indicator in a number of ways.

For example, when the indicator has the capability of being at several intensities (such as an incandescent device), the indicator can be set to a given intensity level by setting the applied voltage and/or current to an appropriate steady-state level.

On the other hand, when the indicator has generally only two levels of intensity (on and off, such as with an LED), the indicator can be turned on and off in rapid succession and at various intervals to provide the desired intensity. This can be implemented using a specialized hardware circuit or computer software that operates to toggle the state of the indicator at a rate higher than the rate of human flicker perception.

In order to achieve the latter implementation, the associated CPU will generally need to devote a significant number of CPU cycles to turning the indicator on and off at such rate. In many systems this can present an unacceptably high overhead burden on the CPU, as the CPU is required to provide other system tasks.

Accordingly, preferred embodiments of the present invention preferably utilize temporal dithering techniques to indicate activity at a much lower duty cycle or "flicker" rate, resulting significantly reducing processing overhead/hardware complexity.

In order to set forth this preferred approach, first consider a case whereby the indicator has a variable intensity. It will be contemplated that a minimum intensity (distinguishable from "off") at which a typical observer could see a variable intensity LED is Imin (e.g. this might be 20% of the LED minimum brightness). The maximum intensity at which the observer could see a variable intensity LED is contemplated to be Imax (e.g 100% of the LED's maximum brightness).

In terms of perception by the observer, the intensity can be selected to change at a rate higher than the observer's perception rate. This latter rate is defined as Tpnf ("Time Perceived No Flicker" in milliseconds, ms). The inverse (flicker rate) will be denoted Spnf ("Switched Perceived No Flicker" in Hz).

Generally, the peripheral vision of a typical observer can detect around 60 Hz flicker, so an exemplary selected flicker rate Spnf will be 72 Hz, with a corresponding Tpnf of 13.888 ms.

Next, it is contemplated that the rate of change of intensity should be changed less often than the observer's perception rate so that the indicator appears to flicker, but more often than a rate at which the indicator appears to provide merely a blink. This rate will be defined as Tf (in ms) and Sf (Hz). Exemplary values are Tf=50 ms and Sf=20 Hz.

It is further contemplated that a total of Nli different levels of intensity are available ("Number of LED Intensities"). An exemplary value of Nli=10 levels will be selected. Using the computer system 100 as the environment for these intensity levels, a maximum activity rate (such as number of I/O operations per second) will be identified as IOmax (such as IOmax=10,000). Finally, assume that the observer's "idle time" threshold is Ti. This is the maximum elapsed period of time during which the observer expects something to happen, such as Ti=1 sec.

From the above values, the following formulation can be used to determine the intensity of the indicator at any given time. If Utp is defined as "Usage This Period" and Ntp is defined as the "Number of Transactions this Period," then:

$$Utp = (Ntp/IOmax) * Spnf \quad (1)$$

Setting Itp as "Intensity This Period," then:

$$Itp = Utp * (Imax - Imin) \quad (2)$$

Setting Itpr as "Intensity This Period Ranged," then:

$$Itpr = Int(Itp * Nli)/Nli \quad (3)$$

This provides an Litp ("LED Intensity This Period") of:

$$Litp = Itrp + Imin \quad (4)$$

If a flickering indicator is desired, Sf can be substituted in place of Spnf in equation (1). For the following discussion, a flickering indicator will be contemplated as being desired.

While the foregoing formulation may be operable, several real world considerations come into play that may limit its effectiveness. First, LED indicators generally do not have variable intensity characteristics, but are rather two-state devices (on or off). Thus, achieving variable intensity could be obtained by turning the LED on and off faster than Tf. To accommodate the Nli intensity levels, the LED would need to be turned on and off up to Sf*Nli times a second (e.g., a maximum of 20*10=200 in the current example).

Depending on the operation of the system, the flicker rate may be changed on the order of 10 to 20 times a second. Nevertheless, this would still require a significant amount of CPU overhead, and far more than what would be desired or available for dedication to this operation.

Another complication is that if flashing is limited to only 10 times a second, and if 10 levels are involved, it could generally take a full second for the "actual" disc activity level to be indicated to the observer.

A main problem should now be apparent to those skilled in the art: if the indicator is only flashed on and off at 10 times a second, then at a constant rate of I/O the activity will merely appear to flash, and will flash more often at higher levels of activity. But this is not quite the desired effect.

Moreover, the problem becomes worse when activity levels change every ⅒ of second or so.

These and other limitations are preferably addressed by a novel use of temporal dithering; that is dithering in the temporal space. Such temporal dithering is preferably enacted herein based on a supposition that if the required update rate is low, exact representation of the actual activity level may not be achievable, only approximated. However, it is contemplated that such approximation will be sufficient to convey the necessary information to the observer.

Preferably, temporal dithering is implemented herein using a total of Nli*Nli bitmasks (masks), where every mask set has Nli bits. A different mask set is used for each desired intensity level. A different mask set is further used for each instance to avoid a steady "flashing appearance." When a certain intensity value (Iv) is picked up, the next bit will be chosen in the appropriate mask. These considerations will be discussed in greater detail below.

A basic computer software implementation of this approach is given in Listing 1. For simplicity, Nli will be selected to be equal to 8. Generally, any selected value can be used, but those skilled in the art will recognize the efficiencies that can be gained through use of powers of 2.

Listing 1.

```
extern uchar   NliMasks[8] [8];
int            NliPos[8],
int            LedOnOffCount = 0;
int            NoIoStateCount = 0;
//Assume that this is called Sf times a second.
DisplayLed( )
{
    NumIOsDone =      CallStaticsRoutineToFigureOutActivity( );
    Vtp =             NumIOsDone/Iomax * Sf;
    Itp =             Vtp * (Imax–Imin);
    Itpr =            Int (Itp * Nli)/Nli;
    Iv =              Itpr; // This is simply an index into the mask.
    // Bump the dither bit position
    DitherBit =                 NliPos[Iv]++;
    DitherMaskIndex =           (DitherBit >> 3) & 7;
    //In actuality, DitherMaskIndex =   (DitherBit / Nli) % Nli
    DitherBit       & = 7;
    BitOnOrOff = NliMasks[Iv] [DitherMaskIndex] & (1 << DitherBit);
    if (BitOnOrOff)
    {
        TurnOnTheLed( ), //Additional features can be added as
            desired to prevent turning on an already turned on LED.
    }
    else
    {
        Turn OffTheLed( );
    }
    return;
}
```

Preferably, Listing 1 is embodied as the pattern generator 114 of FIG. 2 and is executed by the CPU 106. Generally, the bitmasks generated by Listing 1 will have various permutations. For example, the bit level for the lowest intensity (1 out of 8 bits on in this example) might be:

uchar NliMasks[8][8]={8, 64, 2, 32, 4, 128, 1, 16, . . . } while the 4$^{th}$ mask might provide a sequence such as:

{0x65, 0x93, 0x53, 0xCA, 0x5C, 0x36, 0xA9, . . . } or some other random pattern. At this point it will be observed that the routine preferably uses a variable pattern to simulate an intensity level. By altering the pattern, no static flicker pattern is present, and thus the indicator 118 does not appear to be "blinking" at a constant rate. Constant blinking can often be confused with conveying a "state" rather than an activity level (e.g., similar to a "busy signal" on a phone). Constant repetitious lights thus generally convey different messages than variable flickering.

The exemplary implementation of Listing 1 can be readily modified as required depending on the requirements of a given application. For example, many of the variables in the listing could be instead assigned fixed values. The key values could be selected to be powers of 2 to replace the various multiply and divide operations into shift+ addition operations.

In further preferred embodiments, state information is also conveyed to the observer. State information in this context relates to some characteristic state of the device, such as health (e.g., "power status").

By way of illustration, it is contemplated that no light from the indicator 118 corresponds to a state of no power (i.e., the system 100 is turned off). Thus, when the system 100 is on, some level of indication generally needs to be conveyed by the indicator 118.

It is further contemplated that when the system 100 is on, albeit in an idle state, the indicator 118 should display a solid light of given intensity (i.e., no flashing/flickering). This can be readily implemented using Listing 2, which is a preferred modification of Listing 1. As before, Nil is set to 8.

Listing 2.

```
extern uchar   NliMasks[8] [8];
int            NliPos[8],
int            LedOnOffCount = 0;
int            NoIoStateCount = 0;
// Assume that this is called Sf times a second.
DisplayLed( )
{
    NumIOsDone = CallStaticsRoutineToFigureOutActivity( );
    // A special case check is inserted here. This will allow previous
    operation to settle down before assuming steady state.
    If (NumIOsDone == 0)
    {
        if (InNoIoState)
            return,
        if(++NoIoStateCount >= Si * Tf)
        {
            InNoIoState =        TRUE;
            NoIoStateCount =     0;
            TurnOnLed();
            LedOnOffCount =      Ti * Sf;
            Return;
        }
    }
    InNoIoState =     FALSE;
    Vtp =             NumIOsDone/Iomax * Sf;
    Itp =             Vtp * (Imax–Imin);
    Itpr =            Int(Itp * Nli) / Nli;
    Iv =              Itpr; // This is simply an index into the mask.
    // Bump the dither bit position
    DitherBit =           NliPos[Iv]++;
    DitherMaskIndex =     (DitherBit >> 3) & 7;
    // In actuality, DitherMaskIndex = (DitherBit / Nli) % Nli
    DitherBit & = 7;
    BitOnOrOff = NliMasks[Iv] [DitherMaskIndex] & (1 << DitherBit);
    if (BitOnOrOff)
    {
        // If the bit has been on too long, it will look solid. Turn it off
        if(++LedOnOffCount > Ti * Sf)
        {
            LedOn OffCount = 0;
            TurnOffTheLed( );
        }
        else
        {
            TurnOnTheLed( ), // Additional features can be added as
            desired to prevent turning on an already turned on LED.
        }
    }
}
```

-continued

Listing 2.

```
    else
    {
        if(--LedOnOffCount <0 -Ti * Sf)
        {
            // LED has been off too long. Turn it on.
            LedOnOffCount = 0;
            TurnOnTheLed( );
        }
        else
        {
            TurnOffTheLed( );
        }
        return;
}
```

As before, Listing 2 is preferably characterized as the pattern generator 114 of FIG. 2 in the form of a software module executed by the CPU 106. Those skilled in the art will recognize that this routine will display a solid LED light when no activity is occurring, and will always display a minimum intensity when power is applied to the system 100.

Both Listing 1 and Listing 2 serve to activate the indicator 118 to provide a different visual indication to the observer in relation to each of a plurality of different operational activities (as well as different states for Listing 2). Furthermore, the varying rate of activation of the indicator is significantly different than the rate of activation as perceived by the observer.

For example, it is contemplated that in some applications, precisely placed and sized pulses (such as from Listings 1, 2) occurring as few as 8 to 10 per second can be perceived as a continuously "on" indication. Similarly, the observer can perceive flickering at a high rate that is, in fact, induced by a significantly lower actual activation rate. The routines discussed above advantageously require significantly reduced CPU overhead as compared to a real time implementation where the perceived rate is the same as the actually applied rate.

Figure 4:
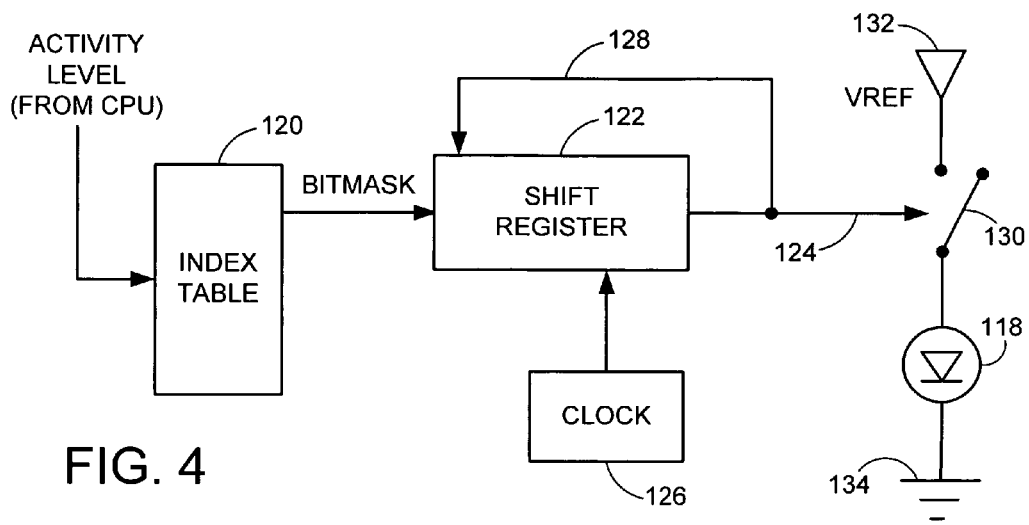
FIG. 4 shows relevant aspects of the pattern generator and switching circuit of FIG. 2 in accordance with a preferred hardware embodiment.

As mentioned above, the foregoing novel temporal dithering techniques can alternatively be implemented in hardware. FIG. 4 shows relevant portions of the pattern generator 114 and the switching circuit 116 in accordance with a preferred hardware construction. Generally, the hardware operates to receive top level activity (and state) indication signals from CPU 106 (or other source), and in response thereto, provide the appropriate bitmasks to activate the indicator in a manner as set forth above.

As shown in FIG. 4, the hardware includes an index table 120 that receives an activity level input from the CPU 106 related to a then-current state of the workstation 100. In response to the activity level input, the index table outputs an associated bitmask to a shift register 122.

Each bit in the bitmask is sequentially output by the shift register 122 on path 124 at a rate controlled by an input clock 126. The shift register is preferably of the "ring" variety so that each output bit is appended to the end of the sequence, as represented by path 128. In this way, once a selected bitmask is loaded into the shift register 122, the shift register operates to automatically sequence through the bit pattern over and over again. This operation will continue until a new pattern is loaded by the index table 120, or further operation of the register is otherwise interrupted.

A switching device 130 is disposed between a reference voltage (VREF) source 132, the LED 118, and a reference line 134. The VREF voltage is preferably a suitable positive voltage such as +5 VDC, and the reference voltage is preferably ground (substantially 0 VDC). The switching device 130 preferably comprises an n-type metal oxide semiconductor field effect transistor (MOSFET) with gate terminal coupled to path 124, source terminal coupled to the VREF source 132 and drain terminal coupled to reference line 134.

In this way, a logical 1 input to the MOSFET from path 124 closes the circuit and activates the LED, and a logical 0 input from path 124 opens the circuit and deactivates the LED. Other configurations can readily be used, however, including multi-pixel visual indicators.

As before, preferably a total of Nil*Nil bitmasks are provided by the index table 120, with a different mask for each activity level. The respective bitmasks can be empirically determined and adapted as desired.

For purposes of the present discussion, it will be initially contemplated that the various bitmasks provide different perceived brightness levels to the user with little or no flickering. This can be readily accomplished through temporal dithering; that is, selecting the cycle rate at a sufficient level so that the user perceives the LED 118 to be more-or-less continuously "on." Depending on the characteristics of the system, a cycle rate of as little as 8 or 10 cycles per second may be sufficient to establish such perceived "steady state" operation of the LED 118.

Because the perceived visual indication is associated with the processing characteristics of the human brain, it will be recognized that at least under certain circumstances nonlinear correlations can exist between intensity and cycle rate. Lower intensity levels may thus need to be cycled at a different rate than the higher intensity levels in order for all of the activity levels to maintain a consistent on (or minimal flickering) appearance.

Such variations can be empirically determined and adjustments made accordingly. Nevertheless, it can be seen at this point that temporal dithering can be utilized to activate and deactivate the LED 118 for each bitmask at a rate that is selected to be different from the rate perceived by the user. In this case, the cycling of the LED 118 is faster than that perceived by the user, but in other embodiments, the rate may be slower.

If a selected bitmask regularly cycles at a rate just sufficient for a user to perceive the LED 118 as presenting a continuously on indication, reducing the rate to just below this threshold will generally result in perception of a relatively fast rate of flashing. As the cycle rate is further reduced, the perceived flashing will continue to slow down until the indicator is perceived to be mostly "off" with periodic pulses of light. Non-uniform cycling rates can further alter both perceived brightness and flash rates.

Accordingly, the bitmasks from the index table 120 can provide both brightness levels and flickering perceptions for at least selected ones, or all of the bitmasks. For example, it may be desired to have activity level 1 exhibit an effective, relatively low steady state brightness with a relatively high rate of flickering, whereas activity level 3 is brighter and has a perceived relatively low flickering rate. Again these are merely illustrative and are in no wise limiting. As before, the use of temporal dithering results in activation rates of the LED 118 that are different from the rates perceived by the user.

Figure 5:
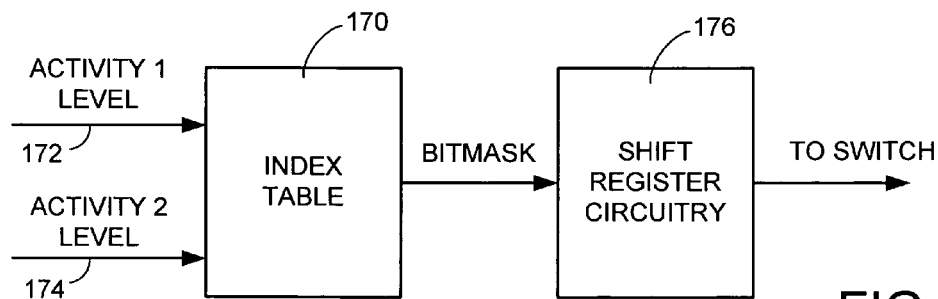
FIG. 5 provides another preferred construction for the circuit of FIG. 2 in which multiple activity levels are concurrently indicated.

Depending on the application, it may be desirable to concurrently convey more than one activity level to the user using the same visual indicator. For example, FIG. 5 provides another preferred hardware embodiment for the pattern generator 114 in which an index table 170 receives two different activity level inputs from the CPU 106 (paths 172 and 174). The table 170 outputs an associated bitmask in relation to the two selected inputs. As in FIG. 4, the output bitmask is supplied to shift register circuitry 176, which activates and deactivates the switch 130.

In some embodiments, a unique bitmask can be preselected for each possible combination of the inputs, which results in the two activity levels combining to locate the unique "address" of the corresponding bitmask within the table 170. This allows the use of a relatively straightforward look-up approach, although the size of the table will need to be increased to accommodate the resulting larger population of entries.

Figure 6:
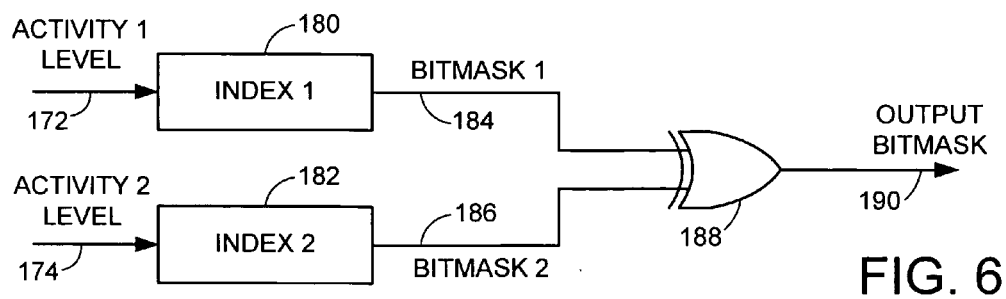
FIG. 6 provides an alternative preferred construction to the circuit shown in FIG. 5.

Alternatively, as shown in FIG. 6, each activity can access a separate portion of the index table, as denoted by INDEX 1 and INDEX 2 blocks 180, 182. The respective outputs of these blocks (paths 184, 186) constitute first and second bitmasks, which are combined by a suitable logical operator (such as an exclusive-OR, XOR block 188) to provide a final output bitmask on path 190. An advantage of this latter approach is the ability to efficiently generate a large number of different output bitmasks, particularly if one of the activities is a systemic state, such as health (e.g., power on, etc.).

While the bitmasks in the various embodiments discussed above are preferably predetermined, with greater levels of complexity in the numbers and types of indications made, in some applications it may be possible to arrive at a sequence that at least periodically appears to a typical user to not indicate activity, but rather that the device has no power, that the desired activity is not in fact taking place, etc.

Figures 7, 8:
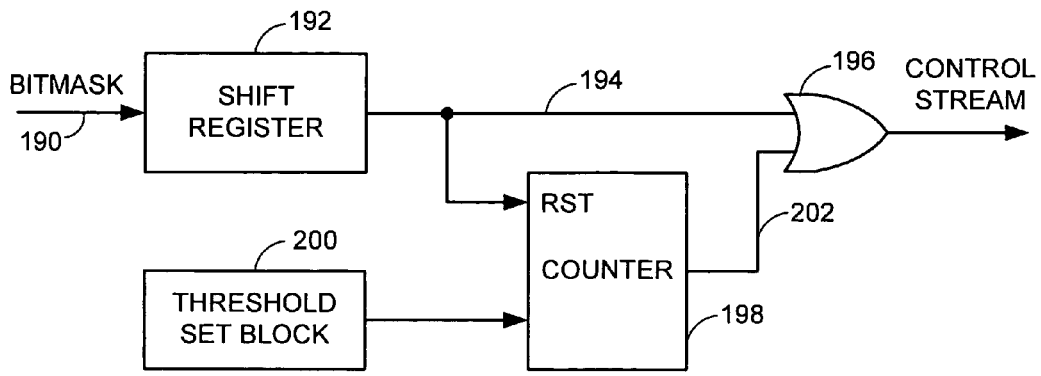
FIG. 7 provides yet another preferred construction for the circuit of FIG. 4.
FIG. 8 generally represents a preferred format for the index table of FIG. 4.

To reduce this possibility, FIG. 7 provides yet another alternative embodiment to the circuitry of FIG. 4. The bitmask from path 190 is preferably supplied to a ring shift register 192, which is clocked as before to sequentially output the individual bit values from the bitmask on path 194. These bit values are presented as an input to a suitable logical operator (such as OR gate 196) as well as to the reset (RST) input of a programmable counter 198.

The counter 198 further receives as an input a threshold value from set block 200, and the output of the counter 198 supplies a second input to the OR gate 196 via path 202.

The counter is reset with each logical 1 on path 194, and initiates counting up to the threshold value supplied by block 200. If this value is reached, the counter 198 outputs a logical 1 on path 202, which inserts a 1 in the final control stream provided to the switch 130. In this way, a run length limited encoding mechanism can be enacted to provide a maximum allowable number of consecutive logical 0's in the values on path 194 (i.e., a maximum allowable "off" time, as in Listing 2). Additional latching can be supplied as desired to provide a minimum on-pulse width, and similar run length encoding can be added to limit the maximum number of consecutive logical 1's.

Another advantage of the circuit of FIG. 7 is the ability to adaptively adjust the threshold of block 200, which can be carried out at the user level and/or during manufacturing. In the latter case, a set of base bitmasks can be formulated for a variety of different devices, allowing differences in LED characteristics and other factors to be adaptively compensated, as desired.

It will now be appreciated that the index table can be characterized as an encoder to output a desired bitmask sequence in relation to the input selection signals provided thereto. A basic organization of a selected table might be arranged as represented in FIG. 8, so that for each activity level, different values of beam intensity and/or flash rate can be assigned, from which unique bitmask sequences can then be derived to exhibit the desired characteristics.

While the hardware embodiments presented herein have contemplated the tables as pre-storing the bit patterns, it will be apparent the tables can alternatively employ suitable algorithms to generate the predetermined bit patterns on the fly.

Moreover, while the bitmasks have been described as being related to specific activities and are thus respectively loaded without regard to what was previously displayed, in other embodiments it may be desirable to combine multiple bitmasks as sequential activities are selected.

For example, an existing bitmask supplied to the shift register circuitry may be modified by a new bitmask for the new activity, so that different patterns are provided to the user in relation to the sequence of activities carried out by the device. These and other considerations are well within the ability of the skilled artisan to implement in view of the foregoing discussion, and are included within the scope of the appended claims.

The various preferred embodiments presented herein will now be recognized as presenting important advantages over the prior art. Various activities of the workstation 100, or other device, can readily be indicated visually through the simple expedient of identifying the appropriate activity level to the pattern generator module. In both software and hardware implementations, significant processing resources are not required to generate the various bitmasks, or to control the rate at which the visual indicator operates in relation thereto. Utilizing temporal dithering techniques further simplifies the control effort, and allows distinct visual indications as perceived by the user to be efficiently implemented.

While a single LED has been preferably used as the visual indicator, such is not necessarily required. Rather, the above embodiments can readily be adapted for use with a visual indicator that incorporates a number of adjacent pixels with the bitmasks controlling individual or multiple adjacent pixels as desired.

It will now be recognized that preferred embodiments of the present invention are generally directed to an apparatus and method for providing a visual indication of operational activity of a device (such as 100).

In accordance with preferred embodiments, a pattern generator (such as 114) provides one or more bitmasks. Each bitmask preferably comprises a selected multi-bit sequence of logical values, and corresponds to a selected operational activity of the device not associated with a visual indicator (such as 118).

A switching circuit (such as 116, 130, 132, 134) selectively activates the visual indicator to provide a different visual indication in relation to each bitmask. Preferably, the visual indicator comprises a single light emitting diode (LED). Preferably, the time-varying rate at which the visual indicator is activated and deactivated by the switching circuit in response to each bitmask is selected to be different from a rate, as perceived by a human observer, of activation and deactivation of the indicator.

The pattern generator can be implemented in software (such as Listing 1, 2) or hardware (FIGS. 4–7). In a software implementation, the pattern generator is preferably characterized as a routine executed by a CPU (such as 106).

In a hardware implementation, the pattern generator preferably comprises an index table (such as 120, 170, 180, 182), which stores each of the bitmasks in turn, and which is accessed in relation to the then-selected operational activity. The pattern generator further preferably comprises shift register circuitry (such as 122, 176, 192) which outputs the logical values of the bitmask to the switching circuit.

The pattern generator further preferably outputs a first bitmask in relation to a first operational activity (such as by 180), outputs a second bitmask in relation to a second operational activity (such as by 182), and outputs a final output bitmask (such as by 188) to control the visual indicator in relation to the first and second bitmasks.

For purposes of the appended claims, the phrase "time-varying rate" will be understood consistent with the foregoing discussion to describe a rate that varies with respect to time, including but not limited to different effective lengths of pulses and/or different elapsed time between successive pulses.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular device environment without departing from the spirit and scope of the present invention.

In addition, although the embodiments described herein are directed to a computer workstation 100, it will be appreciated by those skilled in the art that the claimed subject matter is not so limited and various other types of electronic devices can readily be utilized without departing from the spirit and scope of the claimed invention.

What is claimed is:

1. An apparatus comprising a pattern generator which provides a bitmask to selectively activate a visual indicator at a time-varying rate that is different from a rate of activation of the indicator as perceived by a human observer, the bitmask provided in response to an ongoing operational activity not associated with said indicator.

2. The apparatus of claim 1, wherein the pattern generator is characterized as a programming module resident in a memory space and executed by a processor.

3. The apparatus of claim 1, wherein the pattern generator comprises an index table which stores a plurality of bitmasks each associated with a different operational activity from a plurality of possible operational activities, the index table providing outputting a selected bitmask from the plurality of bitmasks to selectively activate the visual indicator in relation to receipt of an operational activity input signal corresponding to an ongoing operational activity from said plurality of possible operational activities.

4. The apparatus of claim 1, wherein the pattern generator comprises shift register circuitry which loads the bitmask and which sequentially outputs the associated logical values thereof to a switching circuit coupled to the visual indicator.

5. The apparatus of claim 4, wherein the pattern generator further monitors said associated logical values and provides a signal to the switching circuit to change the visual indicator from an activated state to a deactivated state or from the deactivated state to the activated state in relation to said logical values.

6. The apparatus of claim 1, wherein the pattern generator outputs a first bitmask in relation to a first operational activity, outputs a second bitmask in relation to a second operational activity, and outputs a final output bitmask to control the visual indicator in relation to the first and second bitmasks.

7. The apparatus of claim 1, wherein the rate of activation of the indicator as perceived by the human observer is characterized as a time-varying rate so that the indicator appears to flicker as perceived by said observer.

8. The apparatus of claim 1, wherein the bitmask is provided in relation to a transfer rate of data with a data storage medium.

9. The apparatus of claim 1, wherein the bitmask is configured to activate the visual indicator so to concurrently convey two different activity levels for a device.

10. The apparatus of claim 1, wherein the bitmask is selected to activate the visual indicator so that the visual indicator is perceived by the user to alternate between different levels of brightness with respect to time.

11. The apparatus of claim 1, wherein the visual indicator comprises a single light emitting diode (LED).

12. An apparatus comprising a visual indicator and first means for activating said indicator at a time-varying rate that is different from a rate of activation of the visual indicator as perceived by a human observer in response to an ongoing operational activity not associated with said indicator.

13. The apparatus of claim 12, wherein the first means comprises a pattern generator which provides a bitmask for each of a plurality of operational activities with each bitmask comprising a selected multi-bit sequence of logical values, and a switching circuit configured to selectively activate the visual indicator in relation to each said bitmask.

14. The apparatus of claim 12, wherein the first means comprises a programming module stored in a memory space and executed by a processor.

15. The apparatus of claim 12, further comprising a programmable processor, wherein each of the plurality of operational activities is associated with operation of the processor.

16. The apparatus of claim 12, wherein the visual indicator comprises a single light emitting diode (LED).

17. A method comprising steps of:
providing a bitmask for an operational activity not associated with a visual indicator, the bitmap comprising a selected multi-bit sequence of logical values; and
selectively activating said indicator in relation to said sequence at a time-varying rate that is different from a rate of activation of said indicator as perceived by a human observer to convey ongoing operation of said activity.

18. The method of claim 17, wherein the selectively activating step further comprises outputting a first bitmask in relation to a first operational activity, outputting a second bitmask in relation to a second operational activity, and outputting a final output bitmask to control the visual indicator in relation to a combination of the first and second bitmasks.

19. The method of claim 17, wherein the rate of activation of the indicator as perceived by the human observer is characterized as a time-varying rate so that the indicator appears to flicker as perceived by said observer.

20. The method of claim 17, wherein the visual indicator of the selectively activating step comprises a single light emitting diode (LED).

* * * * *